US008832601B2

(12) United States Patent
Williamson

(10) Patent No.: US 8,832,601 B2
(45) Date of Patent: Sep. 9, 2014

(54) ETL TOOL UTILIZING DIMENSION TREES

(75) Inventor: Eric J. Williamson, Fuquay Varina, NC (US)

(73) Assignee: Red Hat, Inc., Raleigh, NC (US)

( * ) Notice: Subject to any disclaimer, the term of this patent is extended or adjusted under 35 U.S.C. 154(b) by 1522 days.

(21) Appl. No.: 12/156,309

(22) Filed: May 31, 2008

(65) Prior Publication Data

US 2009/0300533 A1 Dec. 3, 2009

(51) Int. Cl.
*G06F 3/00* (2006.01)

(52) U.S. Cl.
USPC .......................................... 715/853; 707/602

(58) Field of Classification Search
USPC .......................................... 707/602; 715/853
See application file for complete search history.

(56) References Cited

U.S. PATENT DOCUMENTS

| | | | |
|---|---|---|---|
| 5,278,951 A * | 1/1994 | Camacho et al. | 345/440 |
| 5,657,437 A | 8/1997 | Bishop et al. | |
| 5,819,273 A | 10/1998 | Vora et al. | |
| 5,850,388 A | 12/1998 | Anderson et al. | |
| 5,918,232 A | 6/1999 | Pouschine et al. | |
| 6,092,050 A * | 7/2000 | Lungren et al. | 705/36 R |
| 6,377,287 B1 * | 4/2002 | Hao et al. | 715/853 |
| 6,581,068 B1 | 6/2003 | Bensoussan et al. | |
| 6,671,680 B1 | 12/2003 | Iwamoto | |
| 6,704,721 B1 | 3/2004 | Hellerstein | |
| 6,775,675 B1 | 8/2004 | Nwabueze et al. | |
| 6,993,533 B1 | 1/2006 | Barnes et al. | |
| 7,069,263 B1 | 6/2006 | Yee et al. | |
| 7,181,422 B1 | 2/2007 | Philip et al. | |
| 7,181,438 B1 | 2/2007 | Szabo | |
| 7,185,279 B2 | 2/2007 | Machalek | |
| 7,216,086 B1 | 5/2007 | Grosvenor et al. | |
| 7,304,662 B1 | 12/2007 | Sullivan et al. | |
| 7,318,006 B2 | 1/2008 | You et al. | |
| 7,337,163 B1 * | 2/2008 | Srinivasan et al. | 1/1 |
| 7,433,885 B2 | 10/2008 | Jones | |
| 7,441,197 B2 | 10/2008 | Tschiegg et al. | |
| 7,571,182 B1 * | 8/2009 | Eddy | 1/1 |
| 7,631,020 B1 | 12/2009 | Wei et al. | |
| 7,639,609 B2 | 12/2009 | Bolt et al. | |
| 7,698,349 B2 | 4/2010 | Hulen et al. | |
| 7,734,617 B2 * | 6/2010 | de Souza et al. | 707/713 |
| 7,800,613 B2 | 9/2010 | Hanrahan et al. | |
| 7,801,929 B2 | 9/2010 | Williamson | |
| 7,945,850 B2 | 5/2011 | Machalek | |
| 8,019,679 B2 | 9/2011 | Bennett et al. | |
| 8,099,383 B2 | 1/2012 | Naibo et al. | |
| 8,150,879 B2 | 4/2012 | Williams et al. | |
| 8,204,809 B1 | 6/2012 | Wise | |

(Continued)

OTHER PUBLICATIONS

Shapiro, Adam, Analysis Services: Choosing Dimensi nTypes in SQL Server 2000 Analysis Services, Jul. 19, 2001, Microsoft, 1-15.*

(Continued)

*Primary Examiner* — Ryan Pitaro
(74) *Attorney, Agent, or Firm* — Lowenstein Sandler LLP

(57) ABSTRACT

A method and apparatus for an ETL tool utilizing dimension trees. The method may include identifying various dimensions associated with one or more databases, and creating dimension trees based on these dimensions. The method may further include creating an ETL pyramid having multiple levels, linking the dimension trees to corresponding levels of the ETL pyramid, and creating a table for each level of the ETL pyramid to store a subset of the dimension trees that is linked to a corresponding level of the ETL pyramid.

21 Claims, 8 Drawing Sheets

(56) References Cited

U.S. PATENT DOCUMENTS

| | | | |
|---|---|---|---|
| 2001/0054034 A1 | 12/2001 | Arning et al. | |
| 2002/0013786 A1 | 1/2002 | Machalek | |
| 2002/0016771 A1 | 2/2002 | Carothers et al. | |
| 2002/0183965 A1 | 12/2002 | Gogolak | |
| 2003/0101067 A1 | 5/2003 | Duran et al. | |
| 2003/0187716 A1* | 10/2003 | Lee | 705/10 |
| 2003/0217074 A1 | 11/2003 | Wallace | |
| 2004/0122844 A1 | 6/2004 | Malloy et al. | |
| 2004/0153435 A1 | 8/2004 | Gudbjartsson et al. | |
| 2005/0044079 A1 | 2/2005 | Abineri et al. | |
| 2005/0080802 A1 | 4/2005 | Cras et al. | |
| 2005/0091206 A1 | 4/2005 | Koukerdjinian et al. | |
| 2005/0171833 A1 | 8/2005 | Jost et al. | |
| 2005/0192963 A1 | 9/2005 | Tschiegg et al. | |
| 2006/0004830 A1 | 1/2006 | Lora et al. | |
| 2006/0031110 A1 | 2/2006 | Benbassat et al. | |
| 2006/0031209 A1 | 2/2006 | Ahlberg | |
| 2006/0111874 A1 | 5/2006 | Curtis et al. | |
| 2006/0112070 A1* | 5/2006 | Ramos | 707/1 |
| 2006/0156967 A1 | 7/2006 | You et al. | |
| 2006/0245470 A1 | 11/2006 | Balachandran et al. | |
| 2006/0271884 A1* | 11/2006 | Hurst | 715/854 |
| 2006/0282474 A1 | 12/2006 | MacKinnon, Jr. | |
| 2007/0055596 A1 | 3/2007 | Yankovich et al. | |
| 2007/0129997 A1 | 6/2007 | Davies | |
| 2007/0143661 A1 | 6/2007 | Machalek | |
| 2007/0150862 A1 | 6/2007 | Naibo et al. | |
| 2007/0156677 A1 | 7/2007 | Szabo | |
| 2007/0156718 A1 | 7/2007 | Hossfeld et al. | |
| 2007/0192143 A1 | 8/2007 | Krishnan et al. | |
| 2007/0192724 A1 | 8/2007 | Devore et al. | |
| 2007/0203770 A1 | 8/2007 | Grosvenor et al. | |
| 2007/0219972 A1 | 9/2007 | Cragun et al. | |
| 2007/0250466 A1 | 10/2007 | Imrapur et al. | |
| 2007/0255574 A1 | 11/2007 | Polo-Malouvier et al. | |
| 2007/0255681 A1 | 11/2007 | Tien et al. | |
| 2007/0282673 A1 | 12/2007 | Nagpal et al. | |
| 2007/0291757 A1 | 12/2007 | Dobson et al. | |
| 2008/0005674 A1 | 1/2008 | Wattenberg et al. | |
| 2008/0033587 A1 | 2/2008 | Kurita et al. | |
| 2008/0040309 A1* | 2/2008 | Aldridge | 707/1 |
| 2008/0086716 A1 | 4/2008 | Devore et al. | |
| 2008/0133568 A1 | 6/2008 | Grosset et al. | |
| 2008/0133582 A1 | 6/2008 | Andersch et al. | |
| 2008/0175478 A1 | 7/2008 | Wentland et al. | |
| 2008/0248875 A1 | 10/2008 | Beatty | |
| 2008/0294996 A1 | 11/2008 | Hunt et al. | |
| 2008/0306784 A1 | 12/2008 | Rajkumar et al. | |
| 2008/0307430 A1* | 12/2008 | Friedlander et al. | 719/313 |
| 2009/0006455 A1 | 1/2009 | Carroll | |
| 2009/0012983 A1* | 1/2009 | Senneville et al. | 707/101 |
| 2009/0055467 A1 | 2/2009 | Petersen | |
| 2009/0106290 A1 | 4/2009 | Rivard | |
| 2009/0171606 A1 | 7/2009 | Murata et al. | |
| 2009/0234710 A1 | 9/2009 | Belgaied | |
| 2009/0259501 A1 | 10/2009 | Poissant | |
| 2009/0313268 A1 | 12/2009 | Folting | |
| 2010/0057684 A1 | 3/2010 | Williamson | |
| 2010/0057756 A1 | 3/2010 | Williamson | |
| 2010/0057764 A1 | 3/2010 | Williamson | |
| 2010/0125813 A1 | 5/2010 | Choudhury | |
| 2010/0138449 A1 | 6/2010 | Williamson | |
| 2010/0332583 A1 | 12/2010 | Szabo | |

OTHER PUBLICATIONS

Red Hat Notice of Allowance for U.S. Appl. No. 12/074,035, mailed on May 24, 2010, (p. 316).
Red Hat Office Action for U.S. Appl. No. 12/202,087, mailed on Mar. 15, 2011, (p. 333).
Red Hat Office Action for U.S. Appl. No. 12/202,087, mailed on Aug. 31, 2011, (p. 333).
Red Hat Office Action for U.S. Appl. No. 12/202,085, mailed on Jan. 3, 2011, (p. 423).
Red Hat Office Action for U.S. Appl. No. 12/202,085, mailed on Jul. 18, 2011, (p. 423).
Red Hat Office Action for U.S. Appl. No. 12/325,235, mailed on Sep. 22, 2011, (p. 424).
Red Hat Office Action for U.S. Appl. No. 12/202,077, mailed on Feb. 17, 2011, (p. 474).
Red Hat Notice of Allowance for U.S. Appl. No. 12/202,085, mailed on Sep. 27, 2011, (p. 423).
Red Hat Office Action for U.S. Appl. No. 12/202,077, mailed on Aug. 3, 2011, (p. 474).
Red Hat Notice of Allowance for U.S. Appl. No. 12/202,077, mailed on Nov. 25, 2011 (p. 474).
Microsoft SQL Server 2005, "Mining SQL Server 2005 Data Mining Add-Ins for Office 2007," 2007, 11 pages, accessed online at <http://www.sqlserverdatamining.com/ssdm/Home/DataMiningAddinsLaunch/tabid/69/Default.aspx> on Sep. 22, 2011.
USPTO; Office Action for U.S. Appl. No. 12/202,085, mailed on May 10, 2012.
USPTO;Office Action for U.S. Appl. No. 12/202,085, mailed on Oct. 24, 2012.
USPTO;Non-Final Office Action for U.S. Appl. No. 12/202,085, mailed on Jul. 12, 2013.
USPTO; Non-Final Office Action for U.S. Appl. No. 12/202,085, mailed on Dec. 9, 2013.
USPTO; Office Action for U.S. Appl. No. 12/325,235, mailed on Nov. 6, 2012.
USPTO; Office Action for U.S. Appl. No. 12/325,235, mailed on Jun. 28, 2012.
USPTO; Office Action for U.S. Appl. No. 12/325,235, mailed on Jun. 28, 2011.
USPTO; Office Action for U.S. Appl. No. 12/325,235, mailed on Jun. 5, 2013.
USPTO; Office Action for U.S. Appl. No. 12/325,235, mailed on Dec. 5, 2013.
IBM, Statistical Functions, 2 pages, copyright 1989-2011, accessed online at <http://publib.boulder. ibm.com/infocenter/spssstat/v20r0m0/index.jsp?topic=°/02Fcom.ibm.spss.statistics.help°/02Fsyntransformation_expressions_statistical Junctions.htm> on Jul. 10, 2013.
Robinson, M., "Developing Report Navigation and Drilldown", SQL Server 2005, Aug. 2006, 13 pages, accessed online at <http://msdn.microsoft.com/en-us/library/aa964132(d=printer,v=sql.90).aspx> on Jul. 10, 2013.
Report Studio User Guide 10.1.0, "Using Drill-Through Access", IBM, last updated Oct. 20, 2010, 3 pages, accessed online at <http://pic.dhe.ibm.com/infocenter/cbi/v10r1m0/index.jsp?topic=°/02Fcom.ibm.swg.im.cognos.ug_cr_rptstd.10.1.0.doe/o2Fug_cr_rptstd_id28247cr_rptstd_modrep_drill_through_acce.html> on Jul. 10, 2013.
Shapiro, A., "Analysis Services: Choosing Dimension Types in SQL Server 2000 Analysis Services", SQL Server 2000, Jul. 2000, 23 pages, accessed online at <http://msdn.microsoft.com/enus/library/aa902636(d=printer,v=sql.80).aspx> on Jul. 10, 2013.

* cited by examiner

ETL TOOL UTILIZING DIMENSION TREES

RELATED APPLICATIONS

This application is related to U.S. patent application Ser. No. 12/074,035, filed on Feb. 29, 2008, and assigned to the assignee of the present application and hereby incorporated by reference.

TECHNICAL FIELD

Embodiments of the present invention relate to data warehousing, and more specifically, to an ETL (Extract, Transform, Load) tool utilizing dimension trees.

BACKGROUND

Data stored in a database is usually transactional in nature. A database may be a transactional database or a relational database. Transactional databases simply are a collection of transaction tables. Relational databases add the capacity to match tables together and perform other functions. Since relational databases provide ways to match and organize data, more insight can be achieved through them. Hence, most databases systems by default are relational (encompassing the transactional as well as relational capacity). These databases are intended to contain data in a format that will allow it to be completely matchable with other data in the database or other outside databases. However, this data is not organized in a manner where the natural relationships become apparent or easily utilized. Rather, the relationships in the data are defined and maintained by the application running on top of the database. An individual can only see the relationships in the data if he or she already has an understanding of the database structure and the application functionality.

Database administrators (DBAs) are often faced with the above limitation of data storage when performing data warehousing using conventional ETL tools. An ETL tool extracts data from outside sources, transforms the extracted data to fit business needs, and loads the resulting data into a data warehouse, which may then be used for reporting and analysis. ETL uses a technique known as On-Line Analytical Processing (OLAP). OLAP provides a capability for copying data from a production (application driven) database into separate OLAP tables. While a production database tends to store the data in many small tables with few columns, OLAP tends to shift the production data into fewer, larger tables with many columns.

OLAP uses dimensions that represent relationship descriptors, categories or drivers. Examples of dimensions may include Time, Location, Product, Industry, Account, etc. Dimensions can be organized into "cubes". A cube contains dimensions and a snippet of data (typically a number) which are reflected by the intersection of dimension selections. There are currently three main OLAP cube systems: ROLAP, in which the cube is virtual, calculated on the fly from the OLAP tables themselves; MOLAP, a literal cube of just dimensions and the intersection data stored separately from, or inside an OLAP table or in the computers RAM memory; and HOLAP, which is a hybrid of ROLAP and MOLAP.

The cube system has helped to fill some of the gaps between relational databases and the natural relationships of data. However, cubes also have weaknesses. The cube system is still a relational system with perfectly matchable data. In fact, the cube system is even more so because the cube treats each dimension equally. The natural relationships of data can still be expressed, but typically through many small cubes with different dimensions to capture the relationship. The second weakness of a cube system is that since cubes utilize intersections, dimensions need to be few and small or the process can create unwieldy cubes with many empty spaces (a cube can contain all possible dimension intersections, even if the data does not exist). Therefore cubes tend to eliminate details that may be important, but inexpressible in that format. Further, OLAP dimensions are not easily organized, nor are they easily matched across databases. Dimensions may contain the same theme (like "time") but because the elements are different, joining dimensions together are difficult because they are not naturally defined in the database. Moreover, OLAP-based ETL tools cannot effectively respond to reporting needs, such as ad-hoc drill-down requests, because these ETL tools cannot differentiate between high level and low level data.

BRIEF DESCRIPTION OF THE DRAWINGS

The present invention is illustrated by way of example, and not by way of limitation, in the figures of the accompanying drawings and in which.

DETAILED DESCRIPTION

Figure 1:
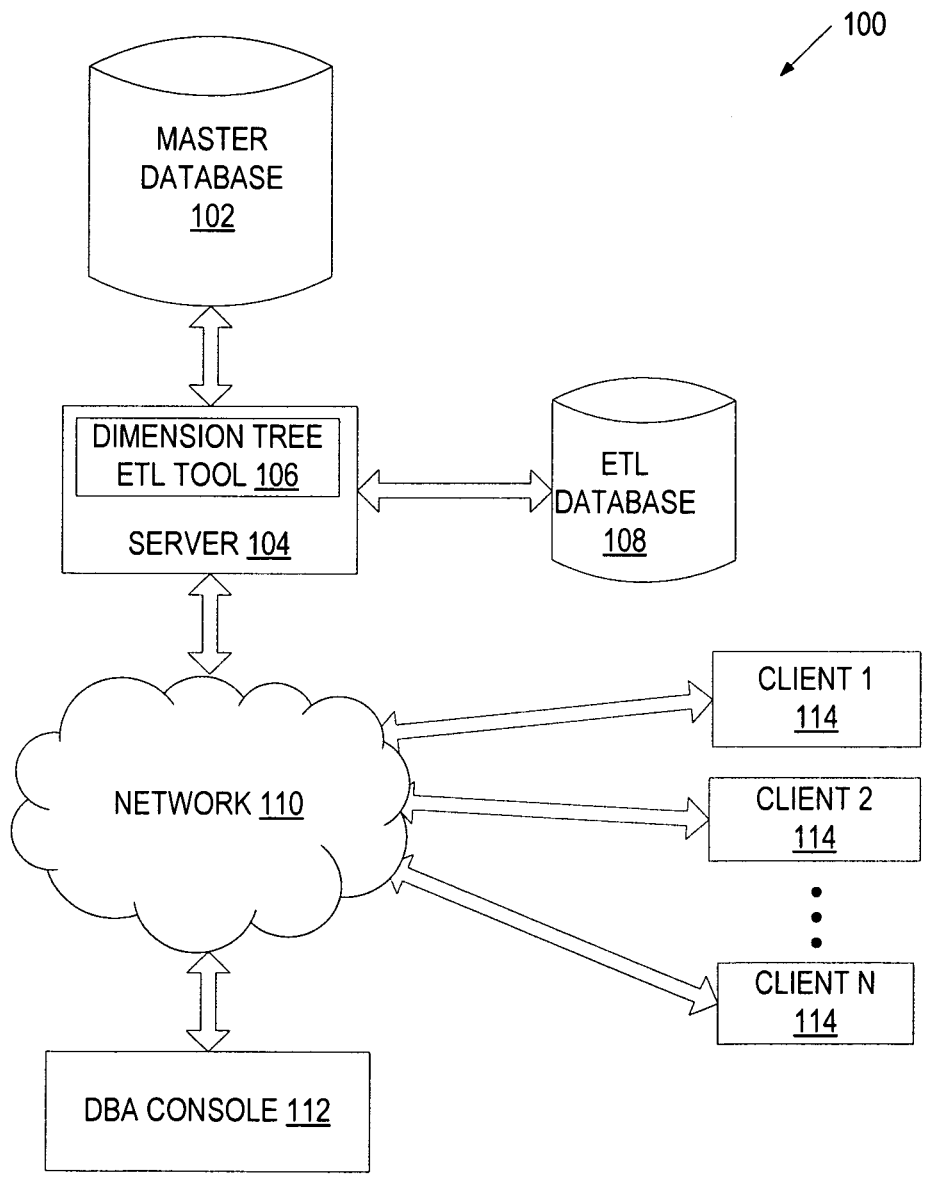
FIG. 1 illustrates a network architecture in which embodiments of the present invention may be implemented.

Described herein is a method and apparatus for an ETL (Extract, Transform and Load) tool. In one embodiment, the ETL tool identifies dimensions associated with one or more source databases, creates dimension trees based on these dimensions, and stores data describing the dimension trees. Next, the ETL tool creates an ETL pyramid with multiple levels, links dimension trees to corresponding levels of the ETL pyramid, and creates a table for each level of the ETL pyramid. A table associated with a specific level of the ETL pyramid stores dimension trees linked to this level for future use in data analysis and reporting.

One advantage of the embodiments described herein is that they allow capturing the natural relationships of data by using dimension trees and different pyramid levels, and maintaining a table at each pyramid level. Various degrees of details can be provided at different pyramid levels, with a few details at the top of the ETL pyramid and numerous details at the bottom of the ETL pyramid. Some embodiments can also allow database data to be easily organized and easily matched across databases via matching levels.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "comparing", "hashing", "maintaining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more a specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary network architecture 100 in which embodiments of the present invention may operate. The network architecture 100 may include client devices (clients) 114, a server 104, a DBA console 112, and a network 110. The clients 114 may be, for example, personal computers (PCs), mobile phones, palm-sized computing devices, personal digital assistants (PDAs), and the like. Each client 114 contains hardware components and software components including a browser application to render data provided by the server 104.

The server 104 may be, for example, a server computer, a PC, or any other machine. The server 104 may be coupled to the clients 114 via the network 110, which may be a public network (e.g., Internet) or a private network (e.g., Ethernet, a Local Area Network (LAN), or a corporate intranet). In addition, the server 104 may be coupled to a console 112 via the network 110. The console 112 may be operated by a DBA and may be, for example, a PC, a PDA, a mobile phone, etc. The console 112 may contain hardware components and software components including a browser application to render data provided by the server 104.

The server 104 may be coupled to a master database 102 which may reside on one or more storage devices. The server 104 may access the master database 102 directly or via a network (e.g., a private or public network). The master database 102 may represent one or more production databases of an organization or multiple organizations. A production database may be a large relational or transactional database.

The server 104 may host an ETL tool 106 that transforms data from the master database 102 to be more suitable for analysis and reporting and stores the transformed data in an ETL database 108. The ETL database 108 may reside on one or more storage devices and may be accessible to the ETL tool 106 via a network (private or public network) or directly. The ETL tool 106 provides graphical user interfaces (GUIs) to assist a DBA operating the console 112 in populating the ETL database 108.

The ETL database 108 is populated using natural relationships of data stored in the master database 102 and the joining power inherent in the relational features of the master database 102. In particular, the ETL database 108 is populated using dimensions and dimension trees. Dimensions are defined from data elements of the master database 102. Dimensions can then be organized into dimension trees. The relationships between the dimension trees can be further defined using a pyramid model, where the top of the pyramid contains only a few dimension tree roots and the base of the pyramid contains the largest number of dimension tree leaves. The ETL database 108 includes a separate table for each level of the pyramid. As a result, analysis or reporting can start at the top of the pyramid and drill down closer to the base of the pyramid. Alternatively, analysis or reporting can start at any level of the pyramid and move downward.

Analysis and reporting associated with the ETL database 108 can be provided to the DBA via the console 112 and/or to end users operating the client devices 114, using SQL queries or some other analytical and reporting mechanisms and tools. As will be discussed in more detail below, the ETL database 108 populated by the ETL tool 106 organizes production data in a manner that makes the natural relationships between data elements become apparent and easily utilized for data analysis and reporting.

Figure 2:
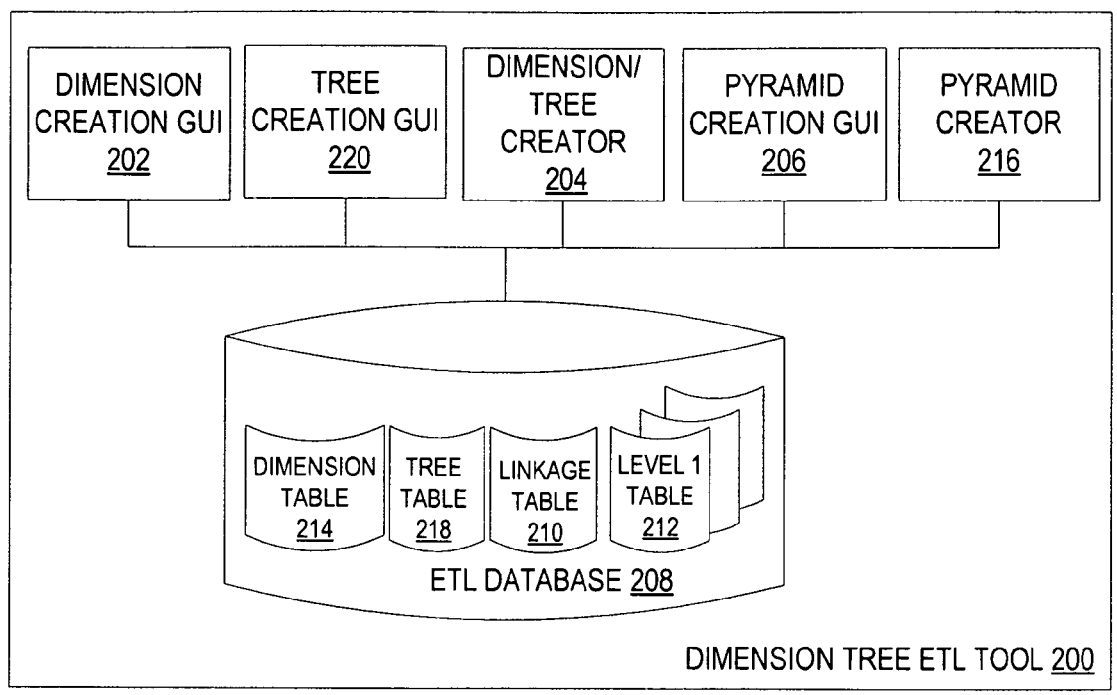
FIG. 2 illustrates a block diagram of one embodiment of an ETL tool.

FIG. 2 is a block diagram of one embodiment of an ETL tool 200. The ETL tool 200 may include a dimension creation GUI 202, a tree creation GUI 220, a dimension/tree creator 204, a pyramid creation GUI 206, a pyramid creator 216, and a reporting database 208.

The pyramid creation GUI 202 allows a user such as a DBA to view data fields (e.g., data element names or column names) included in a production database and to create dimensions from the data fields. An exemplary GUI 202 will be discussed in more detail below in conjunction with FIG. 5. The dimension/tree creator 204 may store the mappings between the production data fields and the dimensions in a dimension table 214 of the ETL database 208.

The tree creation GUI 220 allows a DBA to view existing dimensions and create dimension trees from various dimensions. In addition, in one embodiment, the tree creation GUI 220 allows the DBA to include an existing dimension tree into a new dimension tree or to add an element created for this specific dimension tree, as will be discussed in more detail below. An exemplary GUI 220 will be discussed in more detail below in conjunction with FIG. 6. The dimension/tree creator 204 may store information about the newly created dimension tree in a tree table 218 of the ETL database 208. This information may include, for example, the name of the new dimension tree and identifiers of its constituents (e.g., dimensions, other dimension trees, and/or unique elements).

The pyramid creation GUI 206 may allow the DBA to specify a desired number of levels for an ETL pyramid, and to link dimension trees to specific levels of the ETL pyramid. In addition, in one embodiment, the pyramid creation GUI 206 allows the DBA to link individual dimensions of selected dimension trees, as well as dimensions that do not belong to any dimension trees, to specific levels of the ETL pyramid. An exemplary GUI 206 will be discussed in more detail below in conjunction with FIG. 7. The pyramid creator 216 creates a table 212 for each level of the ETL pyramid in the ETL database 208, and stores relationships between the tables 212 in a linkage table 210 of the reporting database.

Figure 3:
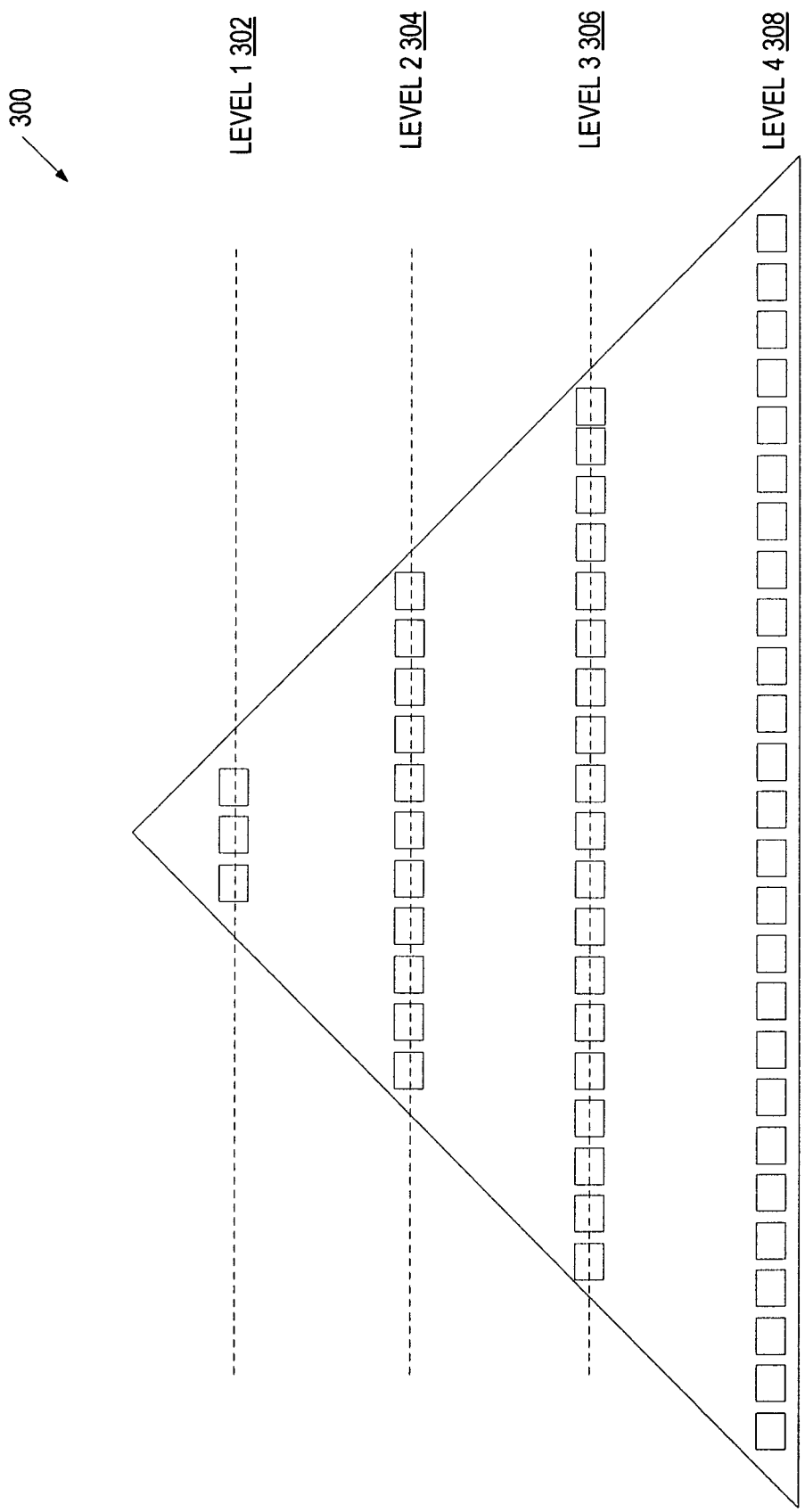
FIG. 3 illustrates an exemplary reporting pyramid in accordance with one embodiment of the invention.

FIG. 3 illustrates a pyramid-like nature of production data transformed by an ETL tool. When performing analysis or requesting reports, user are likely to start with a small amount of detail and then drill down to request more details for specific components of the analysis or the report. This approach is reflected in an ETL pyramid 300.

The ETL pyramid 300 includes individual dimensions and dimension trees. A dimension tree can combine various dimensions. In addition, a dimension tree can include another dimension tree, as well as elements that are not defined as dimensions and that are created specifically for this dimension tree. By using dimension trees, the natural relationships between data components become more apparent, manipulation of data is simplified, and overall user comprehension of the data organization is improved.

The ETL pyramid 300 includes several levels, i.e., levels 302, 304, 306 and 308. The top reporting level 302 includes the least number of components. For example, level 302 may include a few dimension tree roots. Level 304 positioned underneath the top level 302 includes more components than the top level 302, where the components may consist of dimension trees, individual dimensions included in dimension trees, and/or independent dimensions that are not part of any dimension trees. Level 306 positioned underneath the level 304 includes more components than the preceding level 304, and the bottom level 308 includes even more components than the preceding level 306. When used for reporting, each pyramid level may be associated with specific individuals within the organization. For example, the CEO may be mostly interested in the top level summary data to analyze overall statistics of the the organization. A regional manager may be mostly interested in a lower level data that provides summary data for different departments within the region. A salesperson in a specific department may be mostly interested in data describing his or her department, and may not even have access to the top level organization data or region summary data. Pyramid 300 reflects this reporting model.

In one embodiment, a table is created for each pyramid level to store dimensions available at a relevant pyramid level, and to simplify the drill-down operations. Different tables can be setup for different people, different views, different access levels, etc. The tables can be organized in various ways. In one embodiment, the tables can be organized using the MOLAP approach (first approach) and can contain only an index and one master value (the intersection or summary value in the MOLAP cube). In another embodiment, the tables may be organized using an enhanced MOLAP approach (second approach) by containing an index and a master value, and also having an additional value (which can be an index to a different database/schema for additional drilling, description, etc.). In yet another embodiment, the tables can be organized using a further enhanced MOLAP approach (third approach) and can contain an index, a master value, and additional multiple values or details formatted as a flat table. Such a flat table may use row delimiters and be compacted into a row size. For example, below is an exemplary Table 1:

TABLE 1

| Car | Color | Year |
|---|---|---|
| Buick | Red | 2006 |
| Ford | Blue | 1999 |
| Chevy | White | 2002 |

Table 1 can be converted into a single row using row delimiters as follows:

BuickµFordµChevy?redµblueµwhite?2006µ1999µ2002

In still alternative embodiments, a combination of the above table organization approaches can be used for different pyramid levels. For example, the first approach may be used for the top levels of the pyramid, the second approach can be used for middle levels where slightly more details are desirable, and the third approach may used for the base of the pyramid where unsummarized data is contained or as a basis for data mining (e.g., storing statistics or drilling metadata in the flat table).

Figure 4:
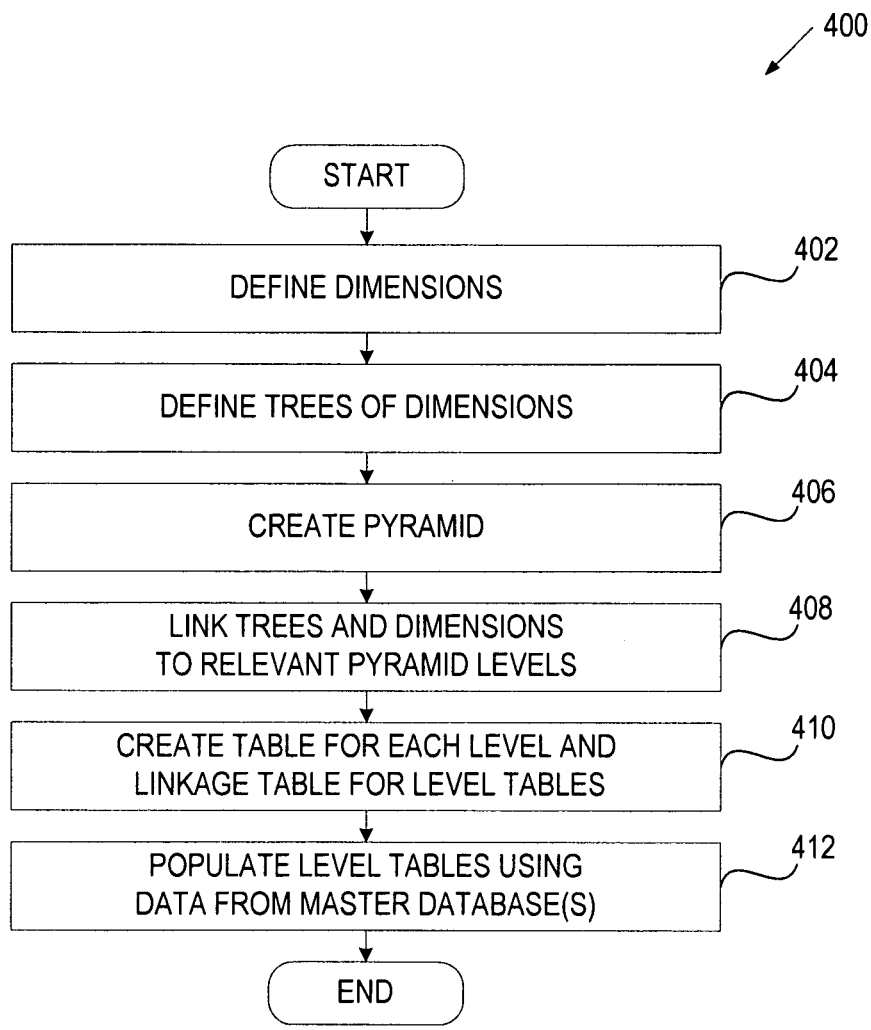
FIG. 4 illustrates a flow diagram of one embodiment of a method for creating an ETL database.

FIG. 4 illustrates a flow diagram of one embodiment of a method 400 for creating an ETL database. The process 400 may be performed by processing logic that may comprise hardware (e.g., circuitry, dedicated logic, programmable logic, microcode, etc.), software (such as instructions run on a processing device), or a combination thereof. In one embodiment, the process 400 is performed by the ETL tool 106 of FIG. 1.

Referring to FIG. 4, method 400 begins with processing logic defining dimensions based on data element names from one or more master (production) databases (block 402). The mapping between dimensions and production data elements may be recorded in a dimension table of the ETL database based on user input specifying dimensions for corresponding data element names from the master database (e.g., via a dimension creation UI). The user may be a DBA or some other person understanding the structure of the production database (collectively referred to herein as a DBA).

At block 404, processing logic defines dimension trees. In one embodiment, a dimension tree includes a set of related dimensions. For example, dimension tree "Time" can include "year," "month," "day," "hour," "minute," and "second" dimensions. When these dimensions are represented as individual data elements in the production database, dimension tree "Time" can be created to illustrate the relationships between these dimensions, and to simplify manipulations of these dimensions (e.g., they can now be manipulated as a single unit). Alternatively, when these dimensions are represented as a single data element (e.g., time) in the production database, this data element can correspond to a dimension tree divided into the above dimensions. Such approach may be useful when, for example, joining two production databases where one production database has "time" as a single data element and the other production database has a separate data element for each of the above time components. In addition, reporting or analysis may require details by day or hour.

In another embodiment, a dimension tree can include unrelated dimensions or other dimension trees. For example, in a corporation ERP system, a dimension for "parts" is distinct enough to have its own defined dimension. Data can be reported on this dimension, and can be sliced and diced with dimension. However, the dimension "parts" can become a component of a dimension tree for "production", but is can also be a component of a separate dimension tree for "Cost of Materials", "Customer Orders", etc. In this case, the elements of the dimension (via the dimension itself) are being recycled, rather then being redefined over again in each case.

In yet another embodiment, a dimension tree may include a new element and/or a consolidator. A new element is an element inside of a regular dimension. The difference here is that in the case of a dimension tree, it may be useful to add an additional element on equal footing with some of the included dimensions. For example, a dimension tree of "Contacts" may include a dimension for customers (including parent and child customers), but may add the element titled "stock holder" to account for any unnamed stockholder activity. A consolidator refers to a consolidation inside of dimension. Reusing the previous example, a "Contacts" consolidator may be titled "business contacts" consolidating CRM customers, Account Payables Customers. This consolidation may be consolidated with another tree or defined consolidation including the element "stock holder" to another dimension titled "government contacts" enabling the "Contacts" tree to hold all contacts that the corporation may have.

Processing logic stores information about each dimension tree in a tree table of the ETL database. This information may contain, for example, the name of the dimension tree and identifiers (e.g., names) of all components of the dimension trees, including individual dimensions, other dimension trees, new elements and consolidators.

At block 406, processing logic creates a pyramid. The pyramid may be created based on DBA input identifying the number of pyramid levels (e.g., via the pyramid creation UI). Alternatively, the number of pyramid levels may be predetermined for a specific production database, company organization, etc.

At block 408, processing logic links dimension trees and dimensions to specific levels of the pyramid. For example, processing logic may display the pyramid, and allow the DBA to provide input specifying which dimension trees and dimensions should be associated with individual pyramid levels (e.g., via the pyramid creation UI).

At block 410, processing logic creates a table for each pyramid level and a linkage table in the reporting database. Each pyramid level table may be created using one of the table organization approaches discussed above. At block 412, processing logic populates the tables associated with the pyramid levels using production data in the master database(s).

Figure 5:
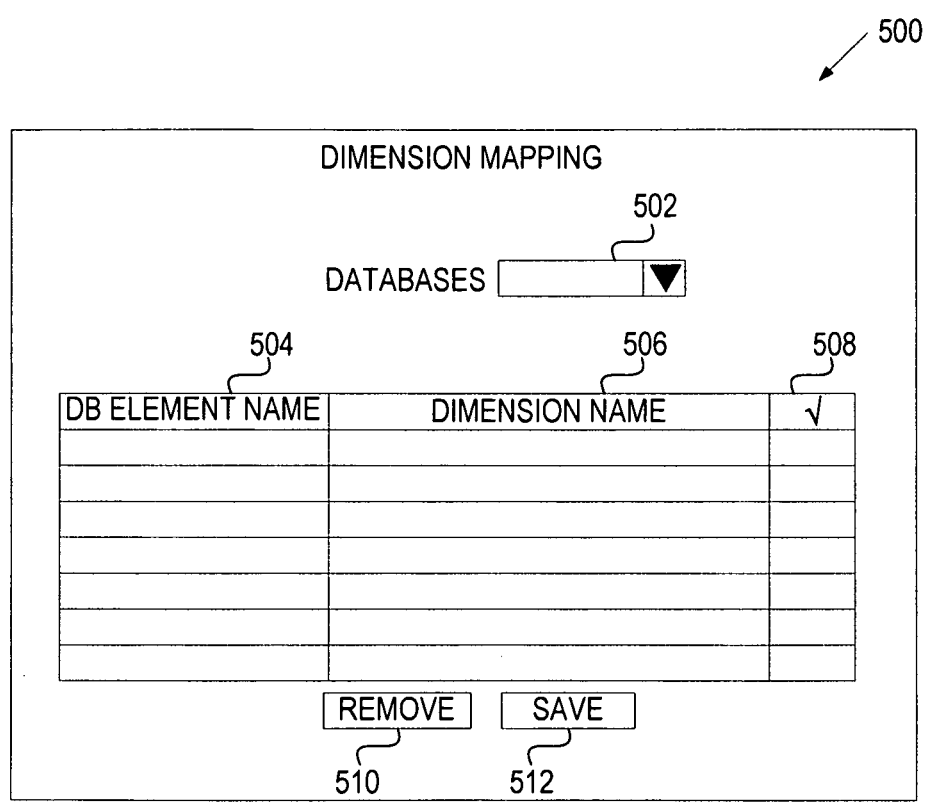
FIG. 5 illustrates an exemplary user interface for defining dimensions in accordance with one embodiment of the invention.

As discussed above, dimension trees utilized by the ETL tool allow production data, as well as the corresponding dimensions to be organized hierarchically independent of the source database. In addition, dimension trees greatly increase the ability of the ETL tool to perform data merging and matching between different systems. Since this matching occurs in the pyramid ETL tool itself, the matching and defining is "clean" from the underlying databases' idiosyncrasies, and each dimension is defined separately FIG. 5 illustrates an exemplary UI 500 for defining dimensions, in accordance with one embodiment of the invention. The dimension mapping UI 500 facilitates user input 502 of one or more databases. In response, a list 504 of fields or element names from the specified database(s) is displayed to the user. The user can then provide a dimension name 506 for some or all element names 504 and may remove some database elements 504 from the list by suing a check box 508 and clicking remove button 510. If the user does not provide a dimension name 506, a database name 504 may be used as a dimension name. By providing a dimension name 506, the user may ensure that database elements having the same meaning but different database names have the same dimension name, which can be especially useful when matching data from multiple databases.

In one embodiment (not shown), the user can also specify which values should be allowed for a specific dimension. For example, values for dimension "month" can be limited to numbers "1" through "12." The DBA can either edit the dimension to allow other values (e.g., month "13"), or if the DBA wishes to ignore the other values for the month, the DBA can allow any of the other values to be defined as a null. The Null element is the "plug" that fixes elements that are not definable, or need not be defined. In this case, the accounting database may use month 13, but if the end user has no need for that month it can be left as null to allow all the numbers to be represented so that nothing is lost and all numbers can be validated.

Figure 6:
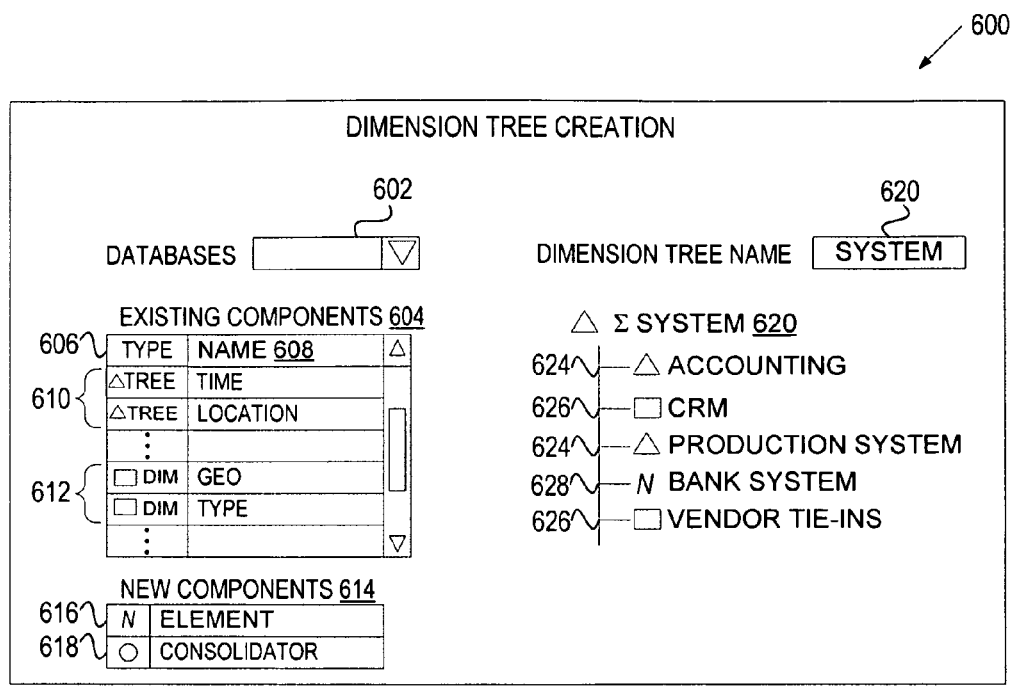
FIG. 6 illustrates an exemplary user interface for creating dimensions trees in accordance with one embodiment of the invention.

FIG. 6 illustrates an exemplary UI 600 for creating dimension trees, in accordance with one embodiment of the invention. The dimension tree creation UI 600 facilitates user input 602 of one or more databases. In response, a list 604 of existing components is displayed to the user. List 604 includes component type 606 and component name 608. Component types can include existing dimension trees 610 and individual dimensions 612. In addition, the dimension tree creation UI 600 can provide new components 614 that include a new element 616 and a consolidator 618.

In order to create a new dimension tree, the user can provide the name 620 and add desired components from the list 604 to the new dimension tree 620 (e.g., using drag and drop operation). In addition, the user can add a new element or consolidator to the dimension tree 620. For example, the user can add an element to the dimension tree 620 (e.g., via drag and drop) and provide the name for the element. In response, a pop-up window can appear requesting the user to enter more details about the element. For example, the pop-up can ask the DBA to define the element (e.g., similar to how any dimension elements are defined) or it can allow the DBA to add the element in undefined form as a placeholder for future use (e.g., in a budget pyramid, the end user will be a source of data and will need some undefined elements to supply the data).

As shown, the new dimension tree 620 includes existing trees 624, individual dimensions 626, and element 628. The user can add more components to the dimension tree 620 or remove any of the displayed components (e.g., by highlighting a component to be removed and activating "remove" button (not shown)). The user can then save the new dimension tree 620 using a "Save" button (not shown).

Figure 7:
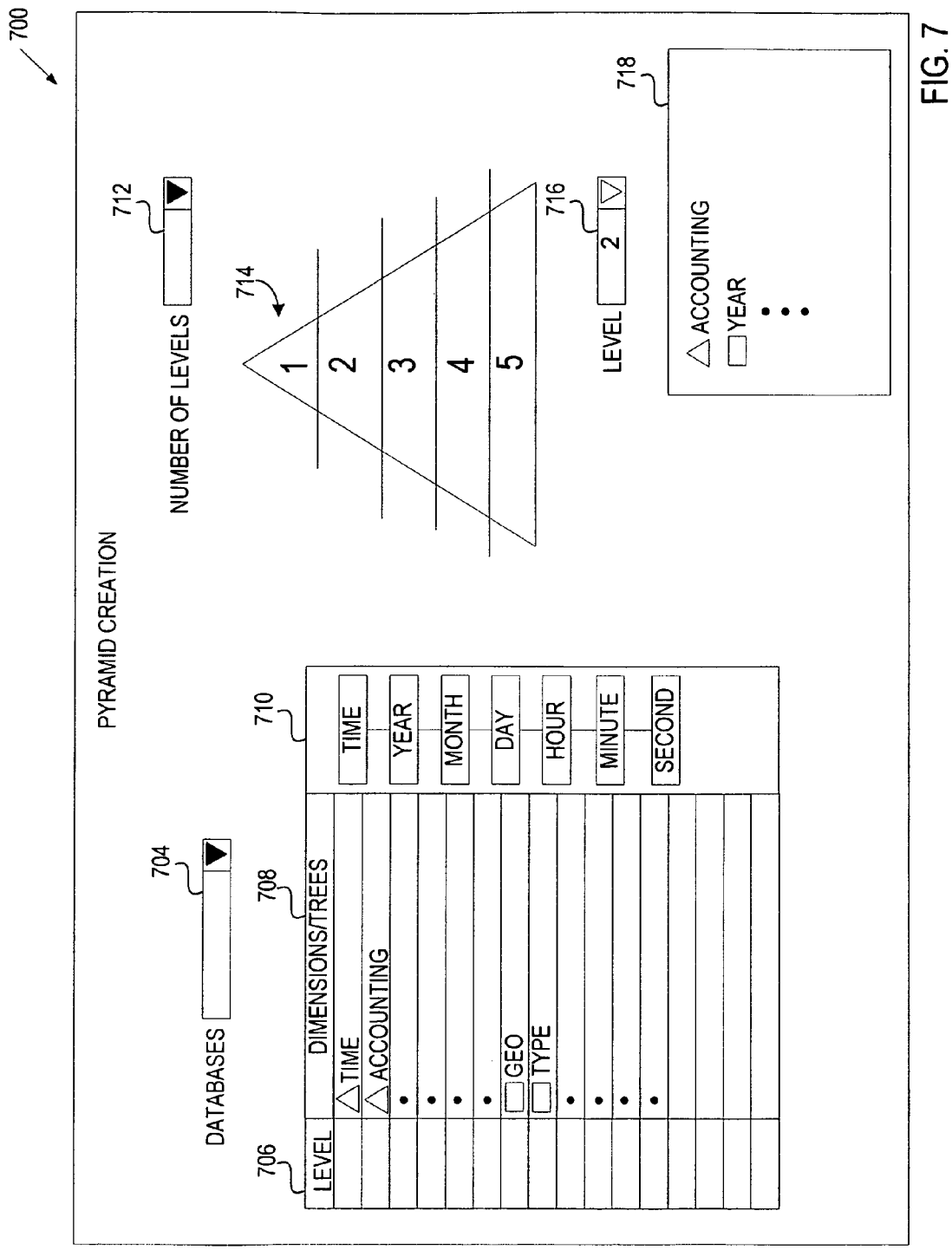
FIG. 7 illustrates an exemplary user interface for creating an ETL pyramid in accordance with one embodiment of the invention.

FIG. 7 illustrates an exemplary UI 700 for creating an ETL pyramid, in accordance with one embodiment of the invention. The pyramid creation UI 700 facilitates user input of the number of levels 712 to be used for the pyramid being created. Upon receiving the user input of the number of levels, a pyramid 714 is presented to the user. The user can then specify one or more production databases 704, resulting in the display of the list of existing dimensions/trees 708 associated with specified database(s) 704. If the user selects a dimension tree in the list 708, the dimension tree is graphically illustrated in area 710, presenting all the components of this dimension tree. The user can then associate this dimension tree or any of its components with a specific level of the pyramid 714 (e.g., using a drug and drop operation, or adding a level number to column 706). In addition, any individual dimensions from the list 708 can be associated with specific levels of the pyramid 714.

Figure 8:
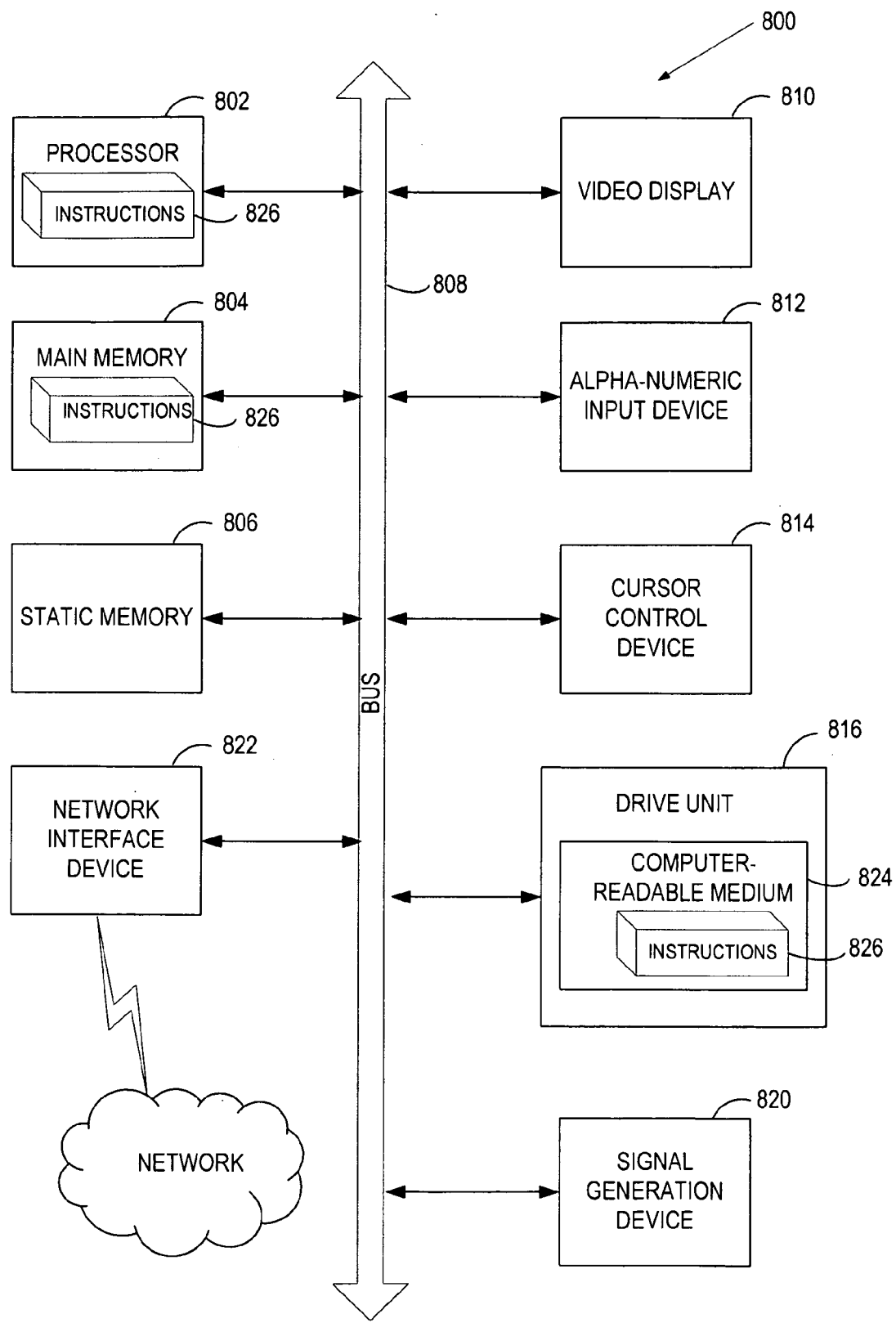
FIG. 8 illustrates a block diagram of an exemplary computer system implementing some embodiments of the present invention.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a device machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 818 (e.g., a data storage device), which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The secondary memory 818 may include a machine-readable storage medium (or more specifically a computer-readable storage medium) 831 on which is stored one or more sets of instructions (e.g., software 822) embodying any one or more of the methodologies or functions described herein. The software 822 may also reside, completely or at least partially, within the main memory 804 and/or within the processing device 802 during execution thereof by the computer system 800, the main memory 804 and the processing device 802 also constituting machine-readable storage media. The software 822 may further be transmitted or received over a network 820 via the network interface device 808.

The machine-readable storage medium 831 may also be used to store master object files and/or deployed object files (e.g., the master object files 106 and/or the deployed object files 270 of FIG. 2), and/or a software library containing methods performed by the data manager 108 and/or devices 102. While the machine-readable storage medium 831 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Thus, a method and system for efficiently distributing data objects over a network have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computer-implemented method comprising:
identifying, by a computer system, a plurality of dimensions associated with one or more databases;
creating a plurality of dimension trees based on the plurality of dimensions;
creating an ETL (Extract, Transform and Load) pyramid having a number of levels;
providing a user interface facilitating user input specifying dimensions and dimension trees for individual levels within the number of levels of the ETL pyramid;
linking the plurality of dimensions and the plurality of dimension trees to the number of levels of the ETL pyramid based on the user input, wherein the levels of the ETL pyramid include components comprising one or more of the plurality of dimension trees, one or more dimensions from the plurality of dimension trees and one or more dimensions that are not part of any of the plurality of dimension trees; and creating a table for each level of the ETL pyramid to store a subset of the plurality of dimension trees that is linked to a corresponding level of the ETL pyramid.

2. The method of claim 1 wherein one of the plurality of dimension trees comprises at least one other dimension tree.

3. The method of claim 2 wherein the one of the plurality of dimension trees further comprises at least one of the plurality of dimensions.

4. The method of claim 2 wherein the one of the plurality of dimension trees further comprises at least one element unique for the one of the plurality of dimension trees.

5. The method of claim 1 wherein creating the plurality of dimension trees comprises:
providing a user interface allowing a user to select a plurality of components for a new dimension tree;
graphically illustrating the new dimension tree to the user; and
storing an identifier of the new dimension tree with identifiers of the selected components in a dimension tree table.

6. The method of claim 5 wherein the plurality of components corresponds to one or more groups, the groups comprising at least one of an existing dimension group, an existing dimension tree group, a new element group, or a new consolidator group.

7. The method of claim 1 wherein creating an ETL (Extract, Transform and Load) pyramid comprises:
receiving user input specifying the number of levels for the ETL pyramid; and
displaying the ETL pyramid using the number of levels.

8. The method of claim 1, wherein linking the plurality of dimension trees to corresponding levels of the ETL pyramid comprises:
allowing a user to select any of the plurality of dimension trees and the plurality of dimensions for association with one of the levels of the ETL pyramid; and
storing an identifier of the selected dimension tree or dimension in a linkage table.

9. The method of claim 8 further comprising:
upon receiving a user selection of a dimension tree from the list, graphically illustrating the selected dimension tree; and
allowing the user to associate the selected dimension tree or any dimension from the selected dimension tree with one of the levels of the ETL pyramid.

10. The method of claim 1, further comprising:
receiving user input specifying a level of the ETL pyramid; and
displaying components linked to the specified level of the ETL pyramid, the components corresponding to at least one of a dimension tree group or a dimension group.

11. A system comprising:
a memory; and
a processor, coupled to the memory, to cause:
a dimension and tree creator to identify a plurality of dimensions associated with one or more databases, and to create a plurality of dimension trees based on the plurality of dimensions; and
a pyramid creator, coupled to the dimension and tree creator, to create an ETL (Extract, Transform and Load) pyramid having a number of levels, to facilitate user input specifying dimensions and dimension trees for individual levels within the number of levels of the ETL pyramid, to link the plurality of dimensions and the plurality of dimension trees to the number of levels of the ETL pyramid based on the user input, and to create a table for each level of the ETL pyramid to store a subset of the plurality of dimension trees that is linked to a corresponding level of the ETL pyramid, wherein the levels of the ETL pyramid include components comprising one or more of the plurality of dimension trees, one or more dimensions from the plurality of dimension trees and one or more dimensions that are not part of any of the plurality of dimension trees.

12. The system of claim 11 wherein one of the plurality of dimension trees comprises at least one of another dimension tree, one or more dimensions, or an element unique for the one of the plurality of dimension trees.

13. The system of claim 11 wherein the dimension and tree creator is to create the plurality of dimension trees by:
providing a user interface allowing a user to select a plurality of components for a new dimension tree;
graphically illustrating the new dimension tree to the user; and
storing an identifier of the new dimension tree with identifiers of the selected components in a dimension tree table.

14. The system of claim 13 wherein the plurality of components corresponds to one or more groups, the groups comprising at least one of an existing dimension group, an existing dimension tree group, a new element group, or a new consolidator group.

15. The system of claim 11, wherein the pyramid creator is to link the plurality of dimension trees to corresponding levels of the ETL pyramid by:
allowing a user to select any of the plurality of dimension trees and the plurality of dimensions; and
storing an identifier of the selected dimension tree or dimension in a linkage table.

16. The system of claim 15 further comprising:
a pyramid creation user interface to graphically illustrate the selected dimension tree upon receiving a user selection of a dimension tree from the list, graphically illustrating the selected dimension tree, and to allow the user to associate the selected dimension tree or any dimension from the selected dimension tree with one of the levels of the ETL pyramid.

17. A non-transitory computer readable storage medium including instructions that, when executed by a processing system, cause the processing system to perform a method comprising:
identifying a plurality of dimensions associated with one or more databases comprising at least one production database;
creating a plurality of dimension trees based on the plurality of dimensions;
creating an ETL (Extract, Transform and Load) pyramid having a number of levels;
providing a user interface facilitating user input specifying dimensions and dimension trees for individual levels within the number of levels of the ETL pyramid;
linking the plurality of dimensions and the plurality of dimension trees to the number of levels of the ETL pyramid based on the user input, wherein the levels of the ETL pyramid include components comprising one or more of the plurality of dimension trees, one or more dimensions from the plurality of dimension trees and one or more dimensions that are not part of any of the plurality of dimension trees; and creating a table for each level of the ETL pyramid to store a subset of the plurality of dimension trees that is linked to a corresponding level of the ETL pyramid.

18. The computer readable storage medium of claim 17 wherein creating the plurality of dimension trees comprises:

providing a user interface allowing a user to select a plurality of components for a new dimension tree;

graphically illustrating the new dimension tree to the user; and storing an identifier of the new dimension tree with identifiers of the selected components in a dimension tree table.

19. The computer readable storage medium of claim 18 wherein the plurality of components corresponds to one or more groups, the groups comprising at least one of an existing dimension group, an existing dimension tree group, a new element group, or a new consolidator group.

20. The computer readable storage medium of claim 17, wherein linking the plurality of dimension trees to corresponding levels of the ETL pyramid comprises:

allowing a user to select any of the plurality of dimension trees and the plurality of dimensions for association with one of the levels of the ETL pyramid; and storing an identifier of the selected dimension tree or dimension in a linkage table.

21. The computer readable storage medium of claim 20, wherein the method further comprises:

upon receiving a user selection of a dimension tree from the list, graphically illustrating the selected dimension tree; and allowing the user to associate the selected dimension tree or any dimension from the selected dimension tree with one of the levels of the ETL pyramid.

* * * * *